United States Patent
Dronadula

(12) 
(10) Patent No.: US 10,187,273 B2
(45) Date of Patent: Jan. 22, 2019

(54) MONITORING WIRELESS STATION EXPERIENCE ON A WI-FI NETWORK BY EMULATING CLIENT RADIOS

(71) Applicant: Fortinet, Inc., Sunnyvale, CA (US)

(72) Inventor: Lakshmi Narayana Dronadula, Bangalore (IN)

(73) Assignee: Fortinet, Inc., Sunnyvale, CA (US)

(*) Notice: Subject to any disclaimer, the term of this patent is extended or adjusted under 35 U.S.C. 154(b) by 97 days.

(21) Appl. No.: 15/275,767

(22) Filed: Sep. 26, 2016

(65) Prior Publication Data

US 2018/0091382 A1 Mar. 29, 2018

(51) Int. Cl.
| H04L 12/24 | (2006.01) |
| H04L 12/26 | (2006.01) |
| H04W 84/12 | (2009.01) |
| H04W 88/08 | (2009.01) |

(52) U.S. Cl.
CPC ...... *H04L 41/5025* (2013.01); *H04L 41/5009* (2013.01); *H04L 41/5038* (2013.01); *H04L 43/04* (2013.01); *H04L 43/0876* (2013.01); *H04L 43/12* (2013.01); *H04L 43/50* (2013.01); *H04W 84/12* (2013.01); *H04W 88/08* (2013.01)

(58) Field of Classification Search
CPC ............ H04L 41/5009; H04L 41/5025; H04L 41/5038; H04L 43/12; H04L 43/04; H04L 43/0876; H04W 84/12; H04W 88/08; H04W 43/50
USPC .......................................... 370/252
See application file for complete search history.

(56) References Cited

U.S. PATENT DOCUMENTS

| 2014/0355527 A1* | 12/2014 | Vaidya | H04W 76/025 370/329 |
| 2015/0282053 A1* | 10/2015 | Kneckt | H04W 48/16 370/329 |
| 2016/0165637 A1* | 6/2016 | Kim | H04W 74/006 370/329 |
| 2016/0174163 A1* | 6/2016 | Emmanuel | H04B 17/336 370/329 |

* cited by examiner

*Primary Examiner* — Faisal Choudhury
(74) *Attorney, Agent, or Firm* — Law Office of Dorian Cartwright; Dorian Cartwright

(57) ABSTRACT

Wireless station experience is monitored by emulating client radios. A radio (or entire transceiver) from a plurality of radios on the access point is assigned to switch from a normal mode to a client mode to operate as a client radio. The client radio of the access point can send a probe request to a normal mode radio of the access point for registration as a client. Network performance can then be measured from the client radio and analyzed by the access point for network problems.

20 Claims, 6 Drawing Sheets

MONITORING WIRELESS STATION EXPERIENCE ON A WI-FI NETWORK BY EMULATING CLIENT RADIOS

FIELD OF THE INVENTION

The invention relates generally to computer networking, and more specifically, to monitoring wireless station experience by emulating client radios.

BACKGROUND

More and more often, Wi-Fi networks are being used in mission critical applications, such as administration of exams at educational institutions, health monitoring at hospitals, and the like. Unfortunately, Wi-Fi networks are subject to various network problems including outages and downtime, lack of responsiveness, log-in problems, and various errors.

Service level agreements (SLAs) are contractual agreements between a network service provider (e.g., ISP) and customers. Failure to meet terms of the SLA can result in error reports and customer dissatisfaction, particularly with mission critical applications. There can also be contractual consequences for provider side non-compliance of SLA terms.

One difficulty with evaluating SLA compliance issues is that SLA inherently concerns the client's experience at a station. Because the stations are independent of the station, there is not directly feedback line as insight. Network problems are thus discovered after being reported by a user. Some solutions download an application to a station for feedback, but this adds to the start-up burden of joining a network and some users or software may be hesitant about downloading malicious software. Further, many regular uses may use different devices (e.g., smart phone, tablet, and laptop) at different times, and each would need individual customization.

Therefore, what is needed is a robust technique easily to monitor wireless station experience on a Wi-Fi network by the network without cooperation from stations.

SUMMARY

These shortcomings are addressed by the present disclosure of methods, computer program products, and systems for monitoring wireless station experience by emulating client radios.

In one embodiment, a radio (or entire transceiver) from a plurality of radios on the access point is assigned to switch from a normal mode to a client mode to operate as a client radio. The client radio of the access point can send a probe request to a normal mode radio of the access point for registration as a client. Network performance can then be measured from the client radio and analyzed by the access point for network problems.

In another embodiment, SLA agreement compliance is proactively verified to avoid potential network problems and contractual consequences. Using parameters of an SLA, a specific stream of test packets can be sent and analyzed. Non-compliance issues are addressed before being reported. Another embodiment initiates testing based on logged reports of network problems.

Yet another embodiment leverages a centralized controller that manages several access points. First, a stress of an overall network can involve more than one client mode radio and more than one access point, and the results are analyzed in the aggregate. Second, neighboring access points can be configured to run tests between each other as stations.

Advantageously, network performance issues from a client perspective are identified without involving stations.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for monitoring wireless station experience by emulating client radios. One of ordinary skill in the art will recognize many additional variations made possible by the succinct description of techniques below.

Figure 1:
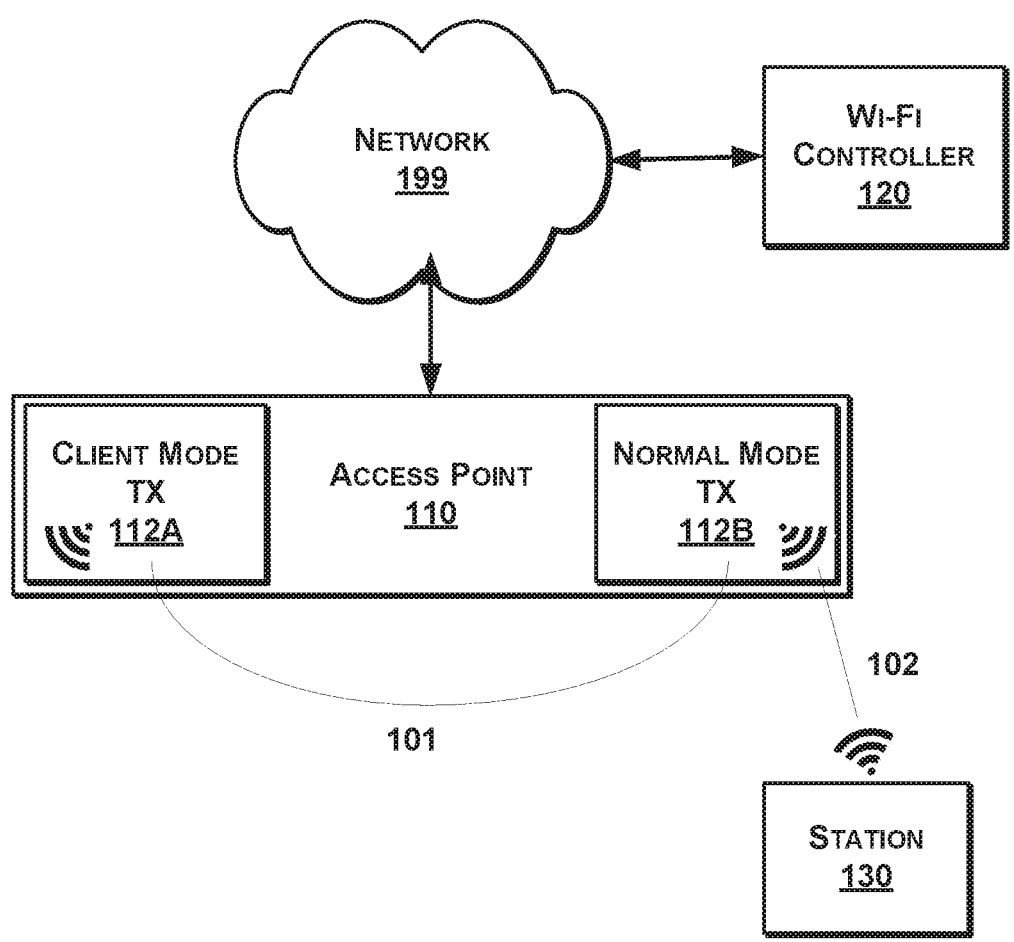
FIG. 1 is a high-level block diagram illustrating a system to monitor wireless station experience by emulating client radios, according to one embodiment.
Figure 2:
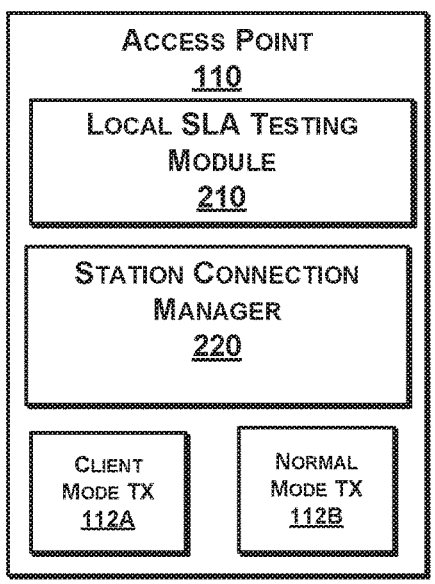
FIGS. 2-3 are more detailed block diagrams illustrating an access point and a Wi-Fi controller of the system of FIG. 1, respectively, according to some embodiments.
Figure 3:
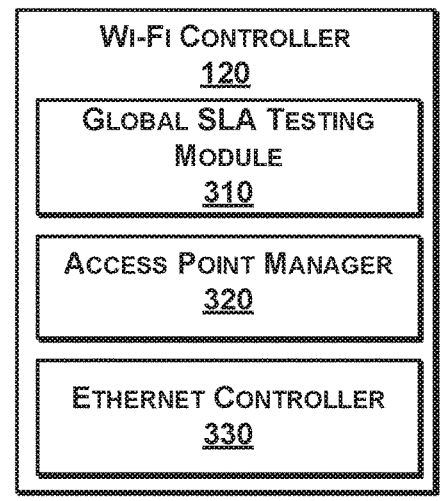

Systems to Monitor Wireless Station Experience (FIGS. 1-3)

FIG. 1 is a high-level block diagram illustrating a system 100 to monitor wireless station experience by emulating client radios, according to one embodiment. The system 100 comprises an access point 110, a Wi-Fi controller 120, and a station 130.

Network components can be directly or indirectly coupled to a network 199, such as a LAN (local access network, a WAN (wide area network), the Internet, a cellular network, through any suitable wired (e.g., Ethernet) or wireless (e.g., Wi-Fi or 4G) medium, or combination. The station 130 is coupled by Wi-Fi connection to the access point 110 which in turn is connected to the network 199 (i.e., to network backbone components therein), preferably through a wired connection. The Wi-Fi controller 120 is also connected to the network 199, preferably through a wired connection. Many variations are possible. For example, there can be additional components such as firewalls, routers, and more switches and stations. Additionally, components can be implemented with a single physical box, or, each could represent a cluster of physical boxes acting in coordination. The system 100 can be implemented locally as a LAN or be implemented in the cloud with certain components being remotely available (e.g., through a firewall). Wi-Fi components can communicate using IEEE 802.11 or other protocols, and wired components can communicate using IEEE 802.3 or other protocols.

The access point 110 includes a normal mode transceiver 112A and a client mode transceiver 112B. Embodiments with different numbers or configurations of transceivers are possible. In normal mode operation, the access point 110 periodically transmits beacons to advertise services and available BSSIDs. Wireless stations within radio range may choose to join the network and send a probe request to initiate the connection process. In client mode operation, one or more transceivers is converted to register with the access point 110 as a station. To do so, the normal mode transceiver 112A continues to send beacons while the client mode transceiver 112B responds to the beacons with a probe request packet sent to the normal mode transceiver 112B (or radios), via link 101.

Network performance can be measured by analysis of packets received by the client mode transceiver 112A. For example, network performance can be compared against one or more SLA agreements to evaluate compliance with promised levels of services. Evaluations can occur as a periodic stress test, responsive to log events received from stations, based on predicted upcoming levels of network usage, when a network configuration is changed, or for other reasons. Results can be analyzed locally or at the Wi-Fi controller 120. Automatic remediation with an automatic adjustment by the system 100 or by notifying a network administrator.

Additional embodiments of the access point 110 are described below in association with FIG. 2.

The Wi-Fi controller 120 manages access points and can coordinate client mode transceivers around the network at various access points. Network wide visibility of the Wi-Fi controller 120 allows test coordination outside of local visibility of the access point 110. For example, the Wi-Fi controller 120 coordinates testing of neighboring access points, and centrally analyses results for SLA non-compliance. The Wi-Fi controller 120 can also coordinate with a SIEM (security information and event management) logging service to automatically follow-up on event records logged at various points around the system 100. In another embodiment, a system-wide stress test can be performed with simultaneous client mode transceiver analyses, and performance at a particular network location can be measured in response to system-wide network loads. The Wi-Fi controller 120 can be cloud-based.

Other tasks of the Wi-Fi controller 120 can include managing other aspects of access points and stations and their relationship, for example, managing BSSID assignments and hand-offs, implementing system-wide Wi-Fi policies, load balancing, managing a number of station connections at a particular access point, and the like. The Wi-Fi controller policies, as implemented, can override, co-exist, or compete with the access point policies concerning channel assignment. Additional embodiments of the Wi-Fi controller 120 are set forth in FIG. 3.

The station 130 is an actual client of the access point 110 via wireless link 102. Client mode testing is performed in a manner that is transparent to the station 130 which requires no reconfiguration or downloaded applications for the access point 110 to estimate network experience from the perspective of the station 110. In one instance, the station 130 originates an event corresponding to network performance, resulting in the access point 110 initiating client mode testing.

Figure 7:
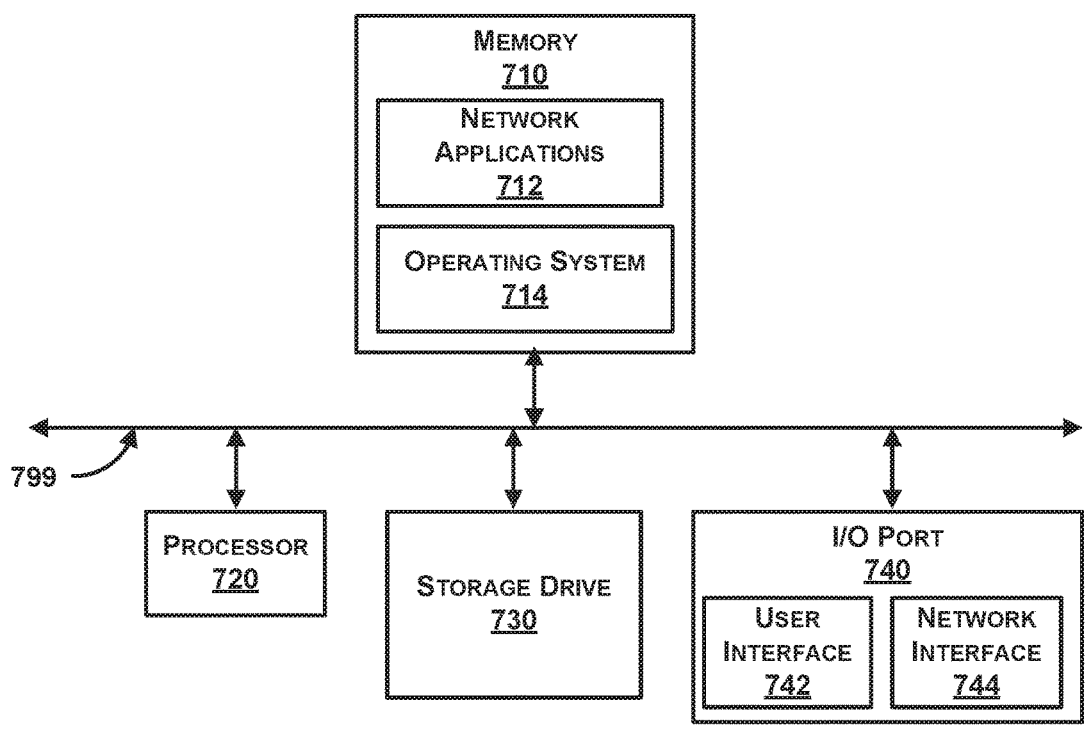
FIG. 7 is a block diagram illustrating an example computing device, according to one embodiment.

The network components of the system 100 can implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 7). In some implementations, the system 100 includes network security products from Fortinet, Inc. of Sunnyvale, Calif., such as FortiGate and FortiAP.

FIG. 2 is a more detailed block diagram illustrating the access point 110 of the system 100, according to one embodiment. The access point 110 comprises a local SLA testing module 210, a wireless station connection manager 220, and the normal mode transceiver 112A and the client mode transceiver 112B. The components can be implemented in hardware, software, or a combination of both.

The local SLA testing module 210 implements dynamic conversions of transceivers between normal mode and client mode. In one case, an SLA agreement or a relevant data extracted therefrom, is received as a benchmark for contractually promised network performance. The SLA agreement describes parameters such as a description of services being provided, reliability (e.g., uptime percentage), responsiveness, network problem reporting procedure, monitoring and reporting service level, consequences for not meeting service obligations, and escape clauses or constraints.

In one embodiment the local SLA test module 210 has access to both test packet streams and received packet streams. Network performance can be measured from comparisons of sent time and received time, RSSI measurements, round trip times, error monitoring, along with other metrics.

The wireless station connection manager 220 manages wireless station connections. A beacon generator (not shown) advertises services. A BSSID table stores BSSID assignments to wireless stations. A hand-off module (not shown) can facilitate fast hand-offs to and from neighboring access points.

The client mode transceiver 112A and the normal mode transceiver 112B each include a radio and antennae, and supporting component can include modulators, multiplexers and demultiplexers, and DSP modules. The client mode transceiver 112A sends test packet streams to the normal mode transceiver 112B.

FIG. 3 is a more detailed block diagram illustrating a representative Wi-Fi controller 120 that comprises a global SLA test module 310, an access point manager 320, and an Ethernet controller 330. The components can be implemented in hardware, software, or a combination of both.

The global SLA testing module 310 coordinates SLA testing at the access point 110 or a group of access points. Commands sent to the local SLA testing module configure SLA testing, and results are reported back for analysis. In one case, prior to an online final exam day at an educational institution, various points of the system 100 can be tested for compliance in order to identify network problems prior to the exam. If network problems arise during the exam as reported by an SIEM server, the global SLA testing module 310 can pinpoint a location for dispatching a test in real-time, or at a later time.

The access point manager 320 communicates with the access point 110 and other access points for Wi-Fi functionality such as beaconing, assigning BSSIDs, and handing-off stations between access points. The Ethernet controller 330 provides I/O ports for the network 199, and other directly connected devices.

Figure 4:
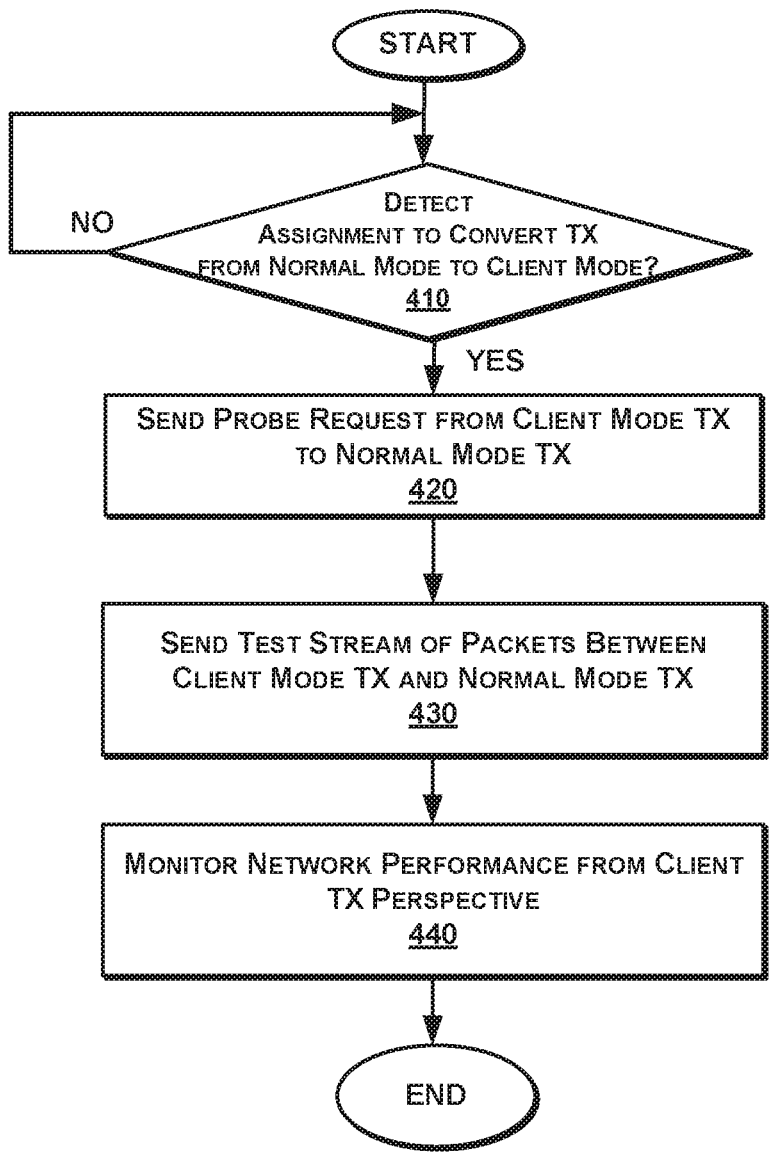
FIG. 4 is a high-level flow diagram illustrating a method of monitoring wireless station experience by emulating client radios, according to one embodiment.
Figure 5:
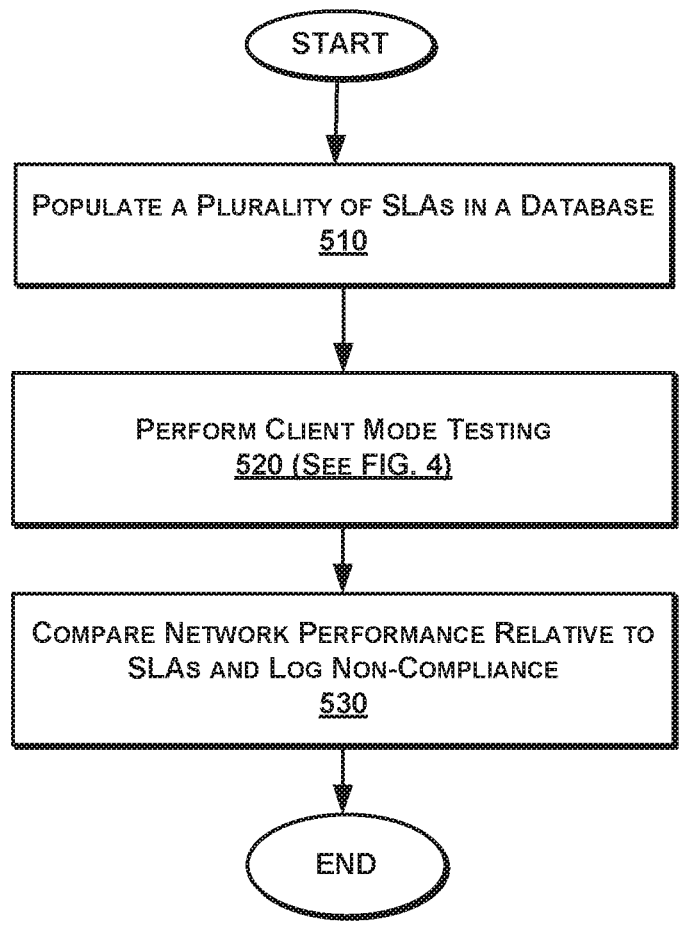
FIG. 5 is a high-level flow diagram illustrating a method for proactively remediating SLA non-compliance problems by emulating client radios, according to one embodiment.
Figure 6:
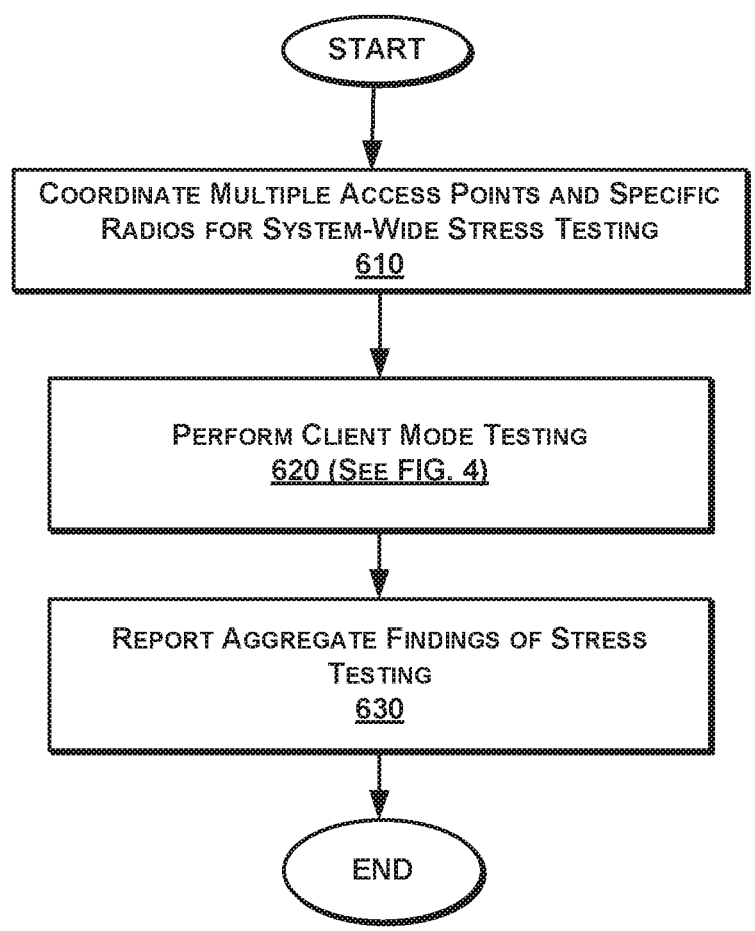
FIG. 6 is a high-level flow diagram illustrating a method for coordinating system-wide stress testing at several access points by emulating client radios, according to one embodiment.

Methods for Monitor Wireless Station Experience (FIG. 4-6)

FIG. 4 is a high-level flow diagram illustrating a method 400 for monitoring wireless station experience by emulating client radios, according to one embodiment. The baseline method 400 is also part of methods shown in FIGS. 5 and 6 and can be performed, for example, by the system 100 of FIG. 1. One of ordinary skill in the art will recognize that the method 400 is non-limiting as other embodiments can have more or less steps and can be performed in a different order.

An access point, in one embodiment, operates normally to provide service discovery beacons and network access for wireless stations. The specialized process begins by detecting an assignment for converting a transceiver on an access point from normal mode to client mode (step 410). Some embodiments switch modes dynamically while other embodiments maintain a permanent client mode transceiver. A probe request is sent from a client mode transceiver to a normal mode transceiver based on information contained within beacons periodically broadcast by the normal mode transceiver. Some embodiments automatically configure the client mode transceiver to a BSSID without the standard registration process, particularly in cases in which registration is unrelated to a reported network problem.

A probe request is sent form the client radio to the access point for registration as a station being serviced by the access based on a beacon received from the access point (step 420). A packet or a stream of test packets is sent from the access point to the client radio (step 430), and vice versa, depending on the type of testing. Network performance is monitored from the client radio and analyzed for network problems (step 440).

FIG. 5 is a high-level flow diagram illustrating a method 500 for proactively monitoring SLA compliance through emulating wireless station experience, according to one embodiment.

A plurality of SLAs are populated in a database (step 510). A user or network administrator enters parameters in a user interface, in an implementation. A Wi-Fi controller can coordinate testing at one or more locations around the network (step 520). A wireless station experience is monitored at access points corresponding to the locations with client mode testing, as described above in the method 400 of FIG. 4 (step 530). Network non-compliance with SLA agreements is logged (step 540) and remediation is automatically initiated (step 550).

FIG. 6 is a high-level flow diagram illustrating a method 600 for coordinating system-wide stress test with multiple access points by emulating client experience, according to one embodiment.

Multiple access points and specific radios at each are centrally coordinated by a controller for system-wide stress testing (step 610). Client mode testing is performed, as described in the method 400 (step 620), with necessary adjustments. Aggregate findings of the stress tests can be reported (step 630). As a result, adjustments can be made. In one embodiment, the method 600 can configure testing between a normal mode TX on one client and several client mode TXs on different access points.

Generic Computing Device (FIG. 7)

FIG. 7 is a block diagram illustrating an exemplary computing device 700 for use in the system 700 of FIGS. 1-3, according to one embodiment. The computing device 700 is an exemplary device that is implementable for each of the components of the system 100, including the access point 110, the Wi-Fi controller 120, the station 230. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage drive 730, and an I/O port 740. Each of the components is coupled for electronic communication via a bus 799. Communication can be digital and/or analog, and use any suitable protocol.

The memory 710 further comprises network applications 712 and an operating system 714. The network applications 712 can include the modules of the access point 110, the Wi-Fi controller 120, the station 230, as illustrated in FIG. 1. Other network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 95, 98, Me, Windows NT, Windows 2000, Windows XP, Windows XP x74 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX74. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730.

The storage drive 730 can be any non-volatile type of storage such as a magnetic disc, EEPROM (electronically erasable programmable read-only memory), Flash, or the like. The storage drive 730 stores code and data for applications.

The I/O port 740 further comprises a user interface 742 and a network interface 744. The user interface 742 can output to a display device and receive input from, for example, a keyboard. The network interface 744 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method, in an access point of a wireless data communication network, for monitoring wireless station experience by emulating client radios, the method comprising the steps of:
    storing a plurality of service level agreements (SLAs) associated with clients of the access point;
    assigning a radio from a plurality of radios on the access point to switch from a normal mode to a client mode with at least one radio remaining in normal mode, where in the client mode, the client mode radio operates as a client to the normal mode radio;
    responsive to detecting a beacon from the access point, sending a probe request from the client mode radio to the normal mode radio and registering the client mode radio as a station being serviced by the access point;
    sending and receiving data packets between the client mode radio and the normal mode radio;
    monitoring network performance from the client mode radio;
    identifying an SLA non-compliance problem based on comparing the monitored network performance against at least one SLA; and
    initiating a remediation protocol for the identified SLA non-compliance problem.

2. The method of claim 1, wherein identifying the network problem comprises:
    proactively identifying the SLA non-compliance prior to being reported by a station;
    logging the identified network non-compliance.

3. The method of claim 2, further comprising:
    receiving a report of an SLA non-compliance from a client; and
    confirming the reported SLA non-compliance with the identified network problem log.

4. The method of claim 1, further comprising:
    receiving a report of a network non-compliance from a client,
    wherein assigning the radio conversion is responsive to the reported SLA non-compliance,
    wherein monitoring network performance comprises monitoring network performance corresponding to the reported SLA non-compliance, and
    confirming the reported SLA non-compliance.

5. The method of claim 1, wherein initiating the remediation protocol comprises:
    adjusting an access point setting to remediate the SLA non-compliance.

6. The method of claim 5, further comprising:
    monitoring network performance to verify remediation of the SLA non-compliance.

7. The method of claim 1, wherein initiating the remediation protocol comprises:
    notifying a network administrator of the SLA non-compliance.

8. The method of claim 1, further comprising:
    receiving a command to test network compliance from a controller that manages a plurality of access points comprising the access point.

9. The method of claim 1, further comprising:
    receiving a command to test network compliance from a controller that manages a plurality of access points comprising the access point,
    wherein an SLA non-compliance report was received by the controller concerning a neighboring access point within range of the client radio,
    wherein the probe request is sent to the neighboring access point; and
    reporting monitored network performance to the controller responsive to the command.

10. The method of claim 1, further comprising:
    predicting a certain network usage at the access point,
    generating data packets according to the certain network usage; and
    determining whether the certain network usage require at least one change on the network to avoid SLA non-compliance.

11. The method of claim 1, further comprising:
    when registration is not being tested, bypassing external registration of the client mode radio for an internal registration of the client mode radio without the need for beacons and the probe response.

12. A non-transitory computer-readable medium that, when executed by a processor, performs a computer-implemented method, in an access point of a wireless data communication network, for monitoring wireless station experience by emulating client radios, the method comprising the steps of:
    storing a plurality of service level agreements (SLAs) associated with clients of the access point;
    assigning a radio from a plurality of radios on the access point to switch from a normal mode to a client mode with at least one radio remaining in normal mode, where in the client mode, the client mode radio operates as a client to the normal mode radio;
    responsive to detecting a beacon from the access point, sending a probe request from the client mode radio to the normal mode radio and registering the client mode radio as a station being serviced by the access point;
    sending and receiving data packets between the client mode radio and the normal mode radio;

monitoring network performance from the client mode radio;

identifying an SLA non-compliance problem based on comparing the monitored network performance against at least one SLA; and initiating a remediation protocol for the identified SLA non-compliance problem.

13. The non-transitory computer-readable medium of claim 12, wherein in the method, identifying the network problem comprises:

proactively identifying the SLA non-compliance prior to being reported by a station;

logging the identified network non-compliance.

14. The non-transitory computer-readable medium of claim 12, wherein the method further comprises:

receiving a report of an SLA non-compliance from a client; and confirming the reported SLA non-compliance with the identified network problem log.

15. The non-transitory computer-readable medium of claim 12, wherein the method further comprises:

receiving a report of a network non-compliance from a client, wherein assigning the radio conversion is responsive to the reported SLA non-compliance, wherein monitoring network performance comprises monitoring network performance corresponding to the reported SLA non-compliance, and confirming the reported SLA non-compliance.

16. The non-transitory computer-readable medium of claim 12, wherein in the method, initiating the remediation protocol comprises:

adjusting an access point setting to remediate the SLA non-compliance.

17. The method of claim 16, further comprising:

monitoring network performance to verify remediation of the SLA non-compliance.

18. The non-transitory computer-readable medium of claim 12, wherein in the method, initiating the remediation protocol comprises:

notifying a network administrator of the SLA non-compliance.

19. The non-transitory computer-readable medium of claim 12, wherein the method further comprises:

receiving a command to test network compliance from a controller that manages a plurality of access points comprising the access point.

20. An access point of a wireless data communication network to monitor wireless station experience by emulating client radios, the access point comprising:

a processor to process data;

a network interface, coupled to the processor, to exchange data with the data communication network;

a memory to store data;

a database to store a plurality of service level agreements (SLAs) associated with clients of the access point;

a local SLA testing module, stored in the memory and executed by the processor, to assign a radio from a plurality of radios on the access point to switch from a normal mode to a client mode with at least one radio remaining in normal mode, where in the client mode, the client mode radio operates as a client to the normal mode radio;

a station emulator module to, responsive to detecting a beacon from the normal mode radio, send a probe request from the client mode radio to normal mode radio and registering the mode client radio as a station being serviced by the access point, wherein the client mode radio and the normal mode radio send and receive data packets from the client mode radio to the normal mode radio;

monitoring network performance from the client mode radio;

identifying an SLA non-compliance problem based on comparing the monitored network performance against at least one SLA; and initiating a remediation protocol for the identified SLA non-compliance problem.

* * * * *